United States Patent [19]

König et al.

[11] 4,406,008

[45] Sep. 20, 1983

[54] THREE PHASE ARC MELTING AND REDUCTION FURNACE

[75] Inventors: Heribert König, Duisburg; Heinz Stark, Essen, both of Fed. Rep. of Germany

[73] Assignee: Mannesmann Aktiengesellschaft, Dusseldorf, Fed. Rep. of Germany

[21] Appl. No.: 264,946

[22] Filed: May 18, 1981

[51] Int. Cl.³ .................. H05B 7/144; H05B 7/18
[52] U.S. Cl. ............................................... 373/102
[58] Field of Search .................. 13/12; 373/102, 103, 373/104, 47, 48, 49

[56] References Cited

U.S. PATENT DOCUMENTS

| | | | |
|---|---|---|---|
| 1,113,778 | 10/1914 | Gray . | |
| 1,127,475 | 2/1915 | Marshall | 373/103 |
| 1,206,057 | 11/1916 | Eckermann et al. | 13/12 X |
| 3,539,695 | 11/1970 | Klee et al. | 373/104 |

FOREIGN PATENT DOCUMENTS 677279 6/1939 Fed. Rep. of Germany .
1937839 7/1969 Fed. Rep. of Germany .
2535207 2/1977 Fed. Rep. of Germany .
139796 9/1977 Norway .

OTHER PUBLICATIONS

"Technische Rundschau", (Technical Review), Bern No. 48, Nov. 1978, pp. 21 to 23.
Article by Dr. Eng. Mollenkamp and Dr. Eng. Kallfelz, "Modern Electro-Reduction Furnaces for Obtaining Ferro Alloys, Crude Iron, and Calcium Carbide, Electro Heat Int'l., " vol. 8, 2/72.
Metallurgy of the Ferro-Alloys by Durrer/Volkert, vol. 2, Springer Publishing Co., Berlin 1972.

*Primary Examiner*—Roy N. Envall, Jr.
*Attorney, Agent, or Firm*—Mandeville and Schweitzer

[57] ABSTRACT

A rectangular metallurgical furnace is provided with at least six electrodes which are symmetrically arranged in two rows along the longitudinal axis of the furnace. Each pair of electrodes form a single phase circuit. A transformer is also provided for each pair of electrodes to form bifilar conductor leads. The spacing between adjacent and opposite electrodes is adjusted to provide a continuous bath surface over a maximum horizontal cross section. Adjacent and opposite pairs of electrodes are located in the corners of imaginary squares.

5 Claims, 3 Drawing Figures

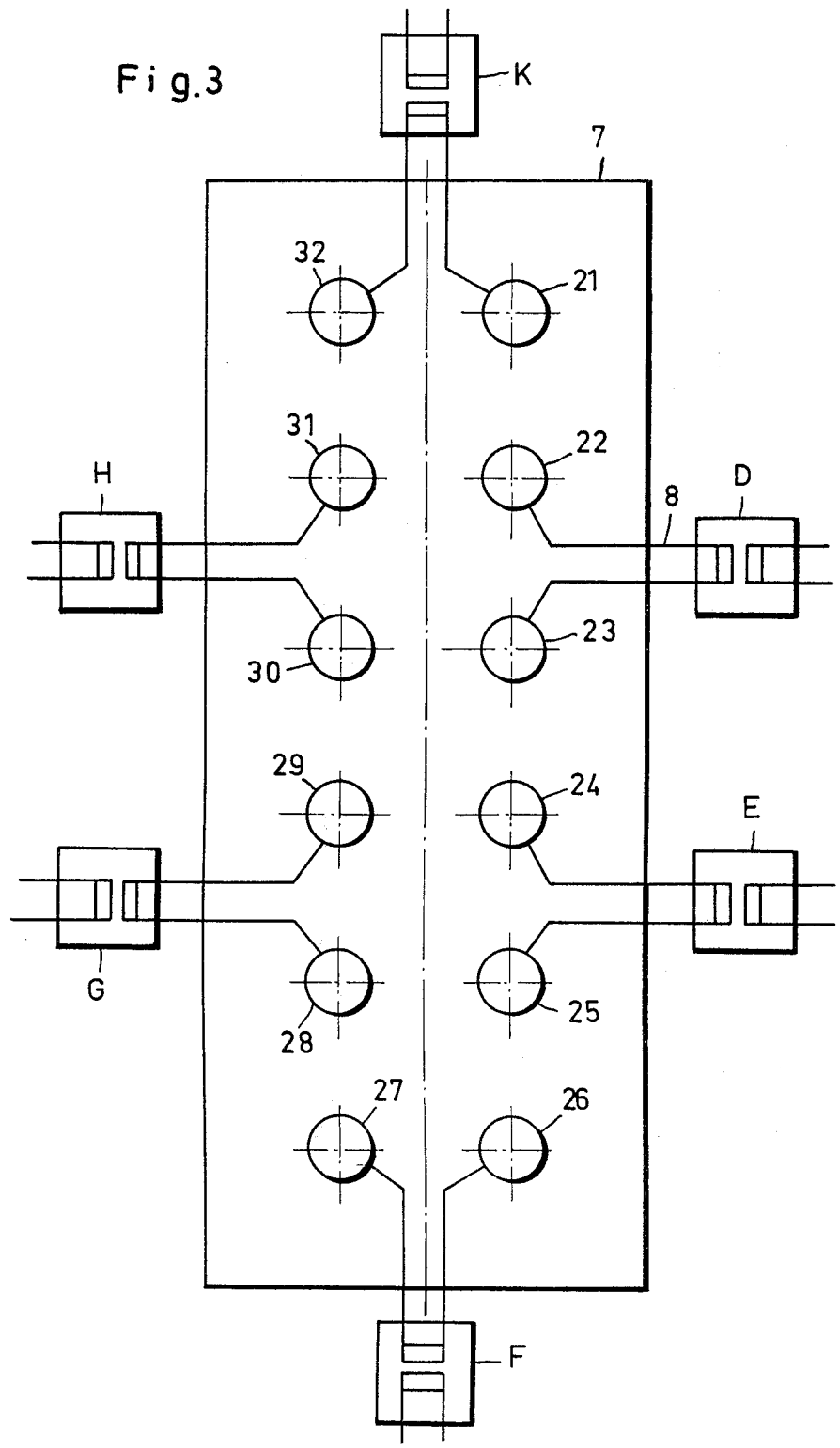

THREE PHASE ARC MELTING AND REDUCTION FURNACE

BACKGROUND OF THE INVENTION AND DESCRIPTION OF THE PRIOR ART

The invention relates to an arc melting or reduction furnace, the latter being intended particularly for the production of ferro or silicon alloys or the like, with elongated non-tippable furnace vessels, the walls of which in each case meet at right angles or whose substantially rectangular floor plan has only slightly rounded corners, whereby for the supply of the electric energy at least six electrodes are used which in the direction of the longitudinal axis of the furnace vessel are arranged equidistantly and in each case two adjacent electrodes are consolidated into a single phase circuit independent of the remaining electrodes, and for each pair of electrodes so consolidated in this manner a transformer is provided and connected to complete the circuits, thus forming a bifilar conductor lead.

For the melting of steel and particularly for the manufacture of ferro and silicon alloys and/or calcium carbide, according to the prior art, vessels having a circular cross section and a triangular electrode arrangement were used (see, for example, the magazine "Technische Rundschau" [Technical Review], Bern No. 48, November 1978, pages 21 to 23: U. Recker-Barbrock, W. Felix and G. Papachristos: "Arc Furnace High Performance Installations and their Sub-Assemblies").

As a result of the steadily expanding steel industry, the demand for ferro alloys shows a clearly ascending tendency. Thereby, as a result of the rapidly increasing energy rates, the prices of raw materials and labor costs, the manufacturers of the ferro alloys have been facing a cost pressure which has also been increasing steadily. In order to utilize the product-related cost degression by reduced investment costs and low wage costs as far as possible, facilities of a steadily increasing capacity are being designed and constructed.

The increase of the heat necessary for the course of the metallurgical process, represented as electrical output of furnace installations, leads to electrodes and furnace hearths with larger and larger diameters. However, eventually the relation between the amount of energy to be transmitted by the electrodes and the possible and/or required energy conversion in the hearth volume leads with increasing calorific requirement to a technical-economic limit of the performance of the three-electrode circular furnace.

From a viewpoint of construction, two limits must be observed in the layout of high performance furnaces:

One limit is set by the available maximum diameter of the electrodes (about 650 mm for graphite electrodes, about 1,400 mm for carbon electrodes, and about 2,000 mm for Soderberg electrodes).

The other limit is set by the maximum diameter of the circular furnace. In fact, the efficiency of the circular furnace decreases with the increasing size of same.

It has been demonstrated that exceeding both limits in a three electrode circular furnace by doubling the number of the electrodes and a corresponding adjustment of the hearth area, while feasible, is uneconomical.

The invention is primarily based on the problem of creating a three phase furnace of the initially cited kind with predominantly high productive capacity and with a furnace output of a process-technical and economical borderline performance of a presently conventional electric furnace which, while maintaining the advantages of the known rectangular furnaces with six electrodes has a higher electro-thermical degree of efficiency by better utilization of the entire hearth surface as process-active surface, said degree of efficiency being understood as being the quotient from the energy fed in minus the sum total of the electrical thermal losses and the energy fed in. At the same time, particularly by a more uniform impinging of the bath and far-reaching electrical symmetrying, the electrical and metallurgical conditions of the process management are to be improved.

In addition, the furnace is intended to require reduced operating costs and to allow for a simpler design of the installation.

True, the German Pat. No. 677,279 discloses a rectangular vessel of an arc furnace, particularly for the fabrication of iron and steel. However, this relates only to a typical tippable arc furnace for the steel fabrication with the six electrodes arranged in two rows being connected in each case in star circuit to two three-phase AC systems. The electrodes are arranged along the longitudinal sides of the furnace vessel. During the tipping the vessel is supposed to be rotated about a vertical axis, so that the narrow vessel side at which the tapping opening is located arrives in the highly tilted position. Apparently, the use of six electrodes is supposed to produce a greater dispersion of the energy fed in. Against this, on account of the rotary movement of the vessel about the vertical axis, the electrodes must be arranged in the central area of the vessel so that at the two narrow ends of the vessel large inactive surfaces are created which adversely affect the electro-thermal degree of effectiveness of the furnace. Moreover, the negative influence of the performance asymmetry is present in an increasing extent in this furnace known from the prior art.

An arc furnace known from the German publication No. 19 37 389 for melting down iron scrap is equipped with a rectangular vessel. Six electrodes are arranged in one row along the vessel. The high voltage conduits are provided at one side of the vessel.

This arrangement, too, is afflicted with the already described disadvantages (particularly conduit asymmetry).

An electric furnace for the recovery of steel from prereduced small fragment, iron-containing material, particularly pellets or fragmentary ores, and/or iron sponge is known from the German publication No. 25 35 207. This furnace is of oblong rectangular shape with more than three electrodes being arranged in one or several rows.

The electrodes thereby are arranged in the longitudinal axis of the vessel.

The purpose of this invention is to produce a flow of material in the furnace vessel, said flow being conducted through different processing zones.

Furthermore, various arrangements of transformers and conductor leads are described for furnaces with three or six electrodes in an article by Dr. Eng. Mollenkamp and Dr. Eng. Kallfelz: "Modern Electro-Reduction Furnaces for Obtaining Ferro Alloys, Crude Iron, and Calcium Carbide," Electro Heat International, Volume 8, 2/72. The arrangement of the transformers for a six electrode furnace is represented in FIG. 4 thereof. However, this relates to a furnace arrangement with six electrodes connected in one row, with the total performance being divided over three single phase transformers. The transformers are placed in one row parallel with the furnace at the longitudinal side.

Such an arrangement proved to be unfavorable for ferro and silicon alloys. High calorific and electrical losses are incurred thereby. In the book entitled: "Metallurgy of the ferro-alloys" by Durrer/Volkert, Volume 2, Springer Publishing Co., Berlin 1972, conductor leads on three electrode furnaces are described on pages 130 and 131, with special consideration being given to the problems of electrical asymmetry, which adversely affects the division of the total output.

The aforementioned publications contain no references for measures by which the thermal degree of effectiveness of the furnace is increased by a better utilization of the entire hearth surface or by the functional combination of the shape of the furnace vessel and of the arrangement of the electrodes. Neither can instructions be read from the cited publications for the improvement of the process-technical and electrical conditions under the operation of the furnace, which form the basis of the present invention.

The Norwegian reference No. 139,796 discloses a circuit of current feeds for a DC reduction furnace with four electrodes arranged in the rectangle. However, the problem to be solved there is different from that of the AC furnaces.

The invention is based on the following considerations:

In a circular furnace, the hearth resistance of the furnace vessel decreases with increasing electrode diameter. In said furnace vessel the energy necessary for the course of the process is converted. The current must be increased commensurate with the decreasing hearth resistance, so that the necessary performance is achieved. This means that the effective force of the current decreases with increasing electrode diameter.

In view of these relations, a rectangular electrode furnace with six electrodes, for example, according to the already cited article by Drs. Mollenkamp and Kallfelz: "Modern Electro Reduction Furnaces for Obtaining Ferro Alloys, Crude Iron and Calcium Carbide" offers the following advantages:

Compared with a circular furnace with three electrodes of comparable output, the rectangular six electrode furnace operates with smaller electrodes and thus has a higher degree of efficiency; because of the smaller electrode diameters smaller conductor cross sections are used in the area of the electrodes; since the height of the hearth is, among other factors, a function of the electrode diameter, the six electrode furnace has a lower hearth height and thus also smaller lengths of the system conductors in the area of the electrodes; because this furnace permits substantially shorter high voltage conduits with smaller conductor cross sections, the inductivity of the conductor system is reduced substantially; the attained lower inductivity (and thus a lower inductive resistance) leads in connection with comparable lower electrode currents to lower idle power; the application of the single phase system allows for a bifilar conductor arrangement from the transformer to the electrode tips; the overall system of six electrodes can be designed as a bifilar conductor system by corresponding selection of the phase sequence and thus by predetermining the direction of the current in the electrodes; by considerable reduction of the impedance losses the possibility is offered of equipping the furnace, according to the invention, at an improved performance factor with transformers and idle power compensation installations of smaller output; a rotary field is avoided by the inductivity-reducing bifilar arrangement, which in the furnaces according to the prior art, puts the bath into a rotary motion, thereby complicating the separation of metal and slag, particularly in the border area; the design of a rectangular furnace vessel is simpler and less costly from a construction point of view than that of a circular furnace both with respect to the steel construction and the refractory infeed.

Starting out from the last described rectangular furnace with six electrodes according to the prior art, an additional number of advantages is achieved with the furnace according to the invention, having the following repercussions compared with the furnace installations according to the prior art with comparable output; particularly in the form of increased electro-thermal degree of efficiency:

SUMMARY OF THE INVENTION

By the design of the furnace vessel and the arrangement of the electrodes, reaction areas are created which almost cover the entire horizontal section of the vessel.

The active reaction surface together with the lower hearth height already mentioned before, results in substantially smaller radiation areas. From a metallurgical point of view this leads to a better utilized hearth area and, furthermore, to improved electrical conditions; primarily, however, the electro-thermical degree of efficiency of the furnace is thereby positively influenced.

By utilizing the entire hearth surface as a process-active surface, the rotation or movement of the oven vessel for the dispersing of the energy load of the hearth, as necessary in circular furnaces, can be eliminated.

By dividing the entire output over three (or a multiple of three) single phase systems in connection with the symmetrical arrangement of these single phase systems about the furnace axis along with the already mentioned far-reaching bifilarity of the entire system the disturbing influences of a geometric and electrical asymmetry are eliminated.

With a symmetrical arrangement of the transformers about the longitudinal axis of the furnace vessel, whereby one narrow side of the furnace remains free, it is possible to provide the tapping devices and the like at the narrow side.

Finally, the constructive arrangement of the entire high performance installation also is simplified by the fact that the charging bunkers may be provided in two parallel rows; in the case of two juxtaposed furnaces the charging bunkers may be provided in only three rows extending parallel with the electrode rows.

Investigations and measurements carried out under experimental operations have evidenced that a 40 watt furnace according to the invention, compared with a 40 watt circular furnace with three electrodes and a 40 watt rectangular furnace with an arrangement of six electrodes in one row produces substantially more favorable factors of economic operation.

The invention is explained in greater detail by means of the appended schematic drawings.

BRIEF DESCRIPTION OF THE DRAWINGS

FIG. 3 shows another embodiment of a twelve electrode furnace with a different arrangement of the high voltage lines.

DETAILED DESCRIPTION OF THE DRAWINGS

Figure 1:
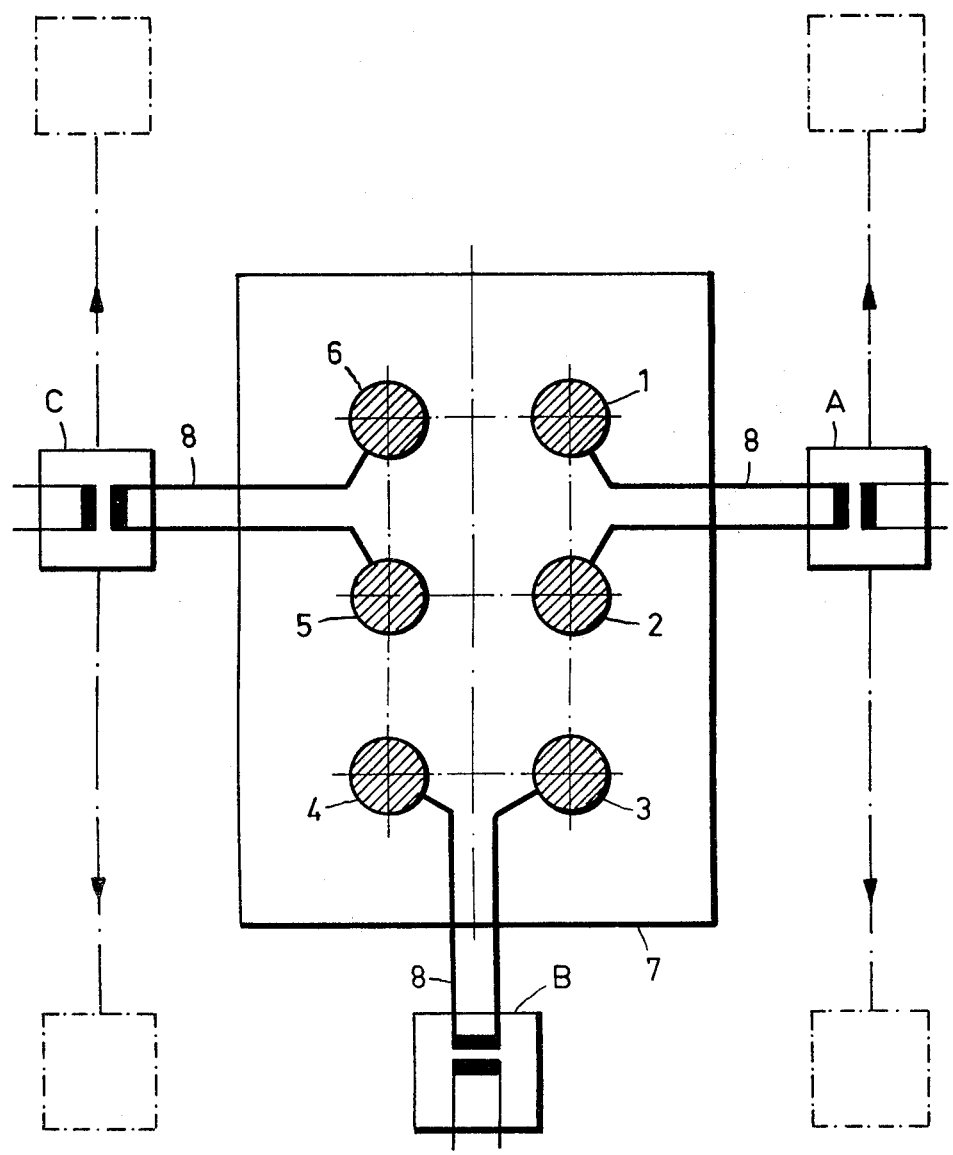
FIG. 1 shows in plan view an electric furnace with six electrodes according to the invention.

FIG. 1 represents a closed reduction furnace with a stationary, oblong rectangular furnace vessel 7. As shown in the illustration, six electrodes 1 to 6 are arranged equidistantly in each case in two rows extending parallel with the longitudinal axis of the furnace vessel, in such a manner that each row contains three electrodes. The electrodes 1, 2, 5, 6 as well as the electrodes 2, 3, 4, 5 are located, viewed in plan view, in the corners of an imaginary square.

In order to achieve an optimal dispersion of energy above the bath, the electrodes are so spaced from each other as well as from the vessel walls that the individual process-technical active bath surfaces extending in each case about the electrodes 1–6 form a continuous surface. The active bath surface surrounding the electrodes refers to that portion of the surface of the melt which is chemically active. The adjacent electrodes in each case, namely 1 and 2, 3 and 4, and 5 and 6, are consolidated into a single phase circuit independent of the remaining electrodes. The electrodes 1 and 2 are connected via high voltage conduits 8 to a transformer A; the pair of electrodes 3 and 4 are connected to a transformer B and the electrode couple 5 and 6 to a transformer C.

The transformers A and C with the associated high voltage conduits are arranged at the longitudinal sides of the furnace vessel, the transformer B is located at the narrow side. As the illustration shows, the arrangement of the high voltage conduits with respect to the longitudinal axis of the furnace vessel 7 is symmetrical. The tapping, not shown, is arranged at the free narrow side of the vessel 7. Transformers A and C of FIG. 1 are, of course, firmly installed. The dotted lines in the corners of FIG. 1 indicate the alternative possibilities for installing the transformers in those cases, whether for technical or procedural reasons, the transformers cannot be placed in the preferred positions indicated in FIG. 1 in full lines. The transformers are always firmly installed with the positions indicated in solid lines as the preferred locations; however, the transformers can also be arranged at either of the ends of the longitudinal sides of the vessel.

As shown in all figures, the go-and-return conduits between the transformer and the electrodes connected to it are placed closely side by side and thus form a bifilar conductor lead which considerably reduces the inductive reactance by electromagnetic fields of opposite current direction.

In the embodiment exemplified there, the three transformers A, B and C which are connected on the primary side to form a three phase current system, with the single phase circuits associated in each case with these transformers, and are connected on the secondary side by means of the metallic product located in the furnace to form a three phase current system which forms an equilibrium to the primary system.

Figure 2:
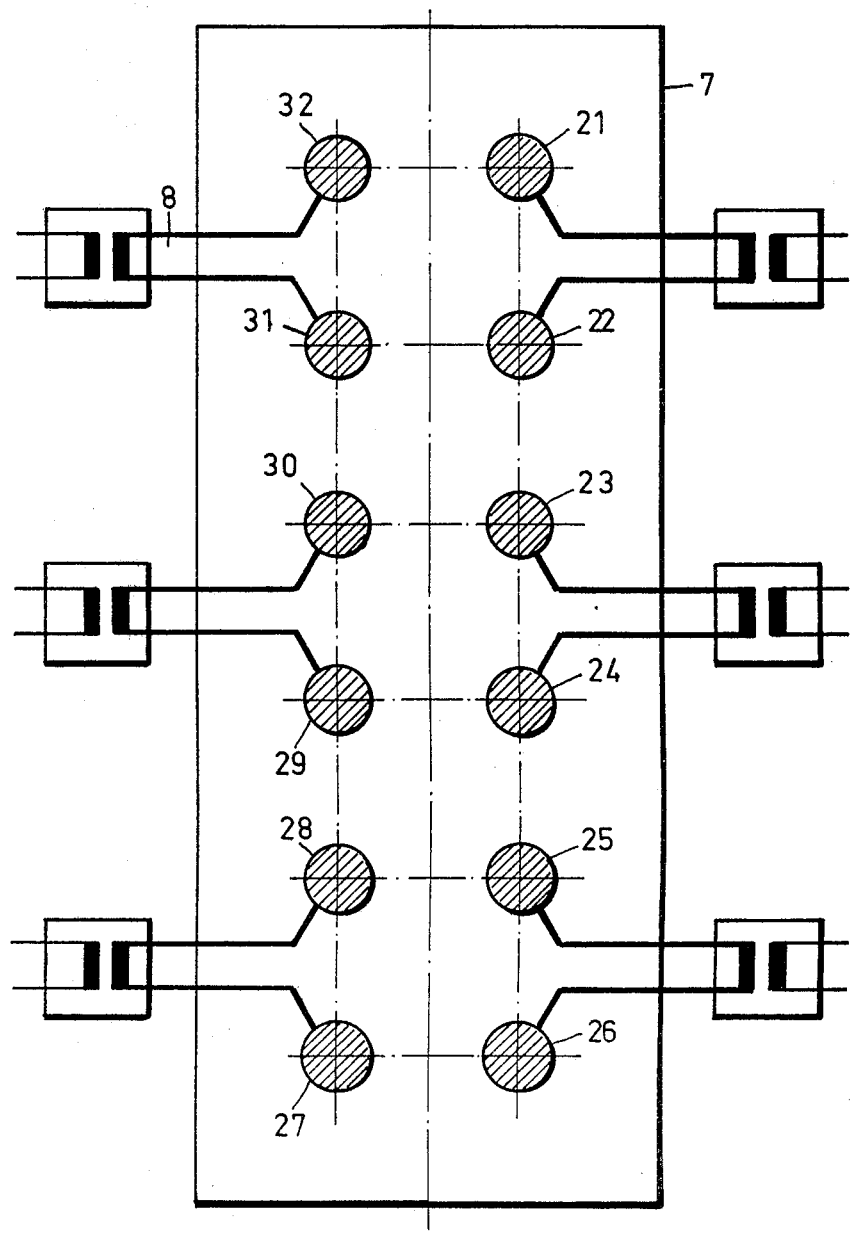
FIG. 2 shows a modification of the electric furnace with twelve electrodes according to the invention, likewise in plan view.

For the voltage regulations in each one of the single phase systems, each transformer (A, B, C) is provided with a permissible load switch. Each electrode can be adjustable individually according to the output fed in accordance to the process effect. The furnace represented in FIG. 2 is supplied energy via twelve electrodes 21 to 32. The arrangement of the electrodes 21 to 32 with respect to the mutual spacing between adjacent electrodes and the distance of the electrodes from the vessel walls is analogous to that shown in FIG. 1. The spacing between adjacent electrodes and the spacing between the individual electrodes and the side walls of the vessel is substantially equal. Three transformers with high voltage conduits 8 are provided on each longitudinal side of the vessel 7.

The arrangement according to FIG. 3 is similar to the arrangement according to FIG. 2, with the only exception that of the six transformers D, E, F, G, H, K in each case two transformers, namely D and E and/or H and G are arranged at the longitudinal sides of the vessel 7. The transformers F and K are arranged with their high voltage conduits at the narrow sides of the furnace vessel 7.

We claim:

1. A three phase arc metallurgical furnace, comprising:
   (a) a stationarily maintained elongated furnace vessel having a substantially rectangular floor plan and a longitudinal axis;
   (b) at least six electrodes providing electrical energy, said electrodes being arranged symmetrically in at least two rows and equidistantly about said longitudinal axis of said furnace vessel;
   (c) said electrodes being divided into pairs of adjacent electrodes, each such pair being electrically connected in series as a single phase circuit, each of said circuits being electrically independent of the remaining circuits;
   (d) a transformer for each of said pair of electrodes to form bifilar conductor leads, said transformers being connected to said electrode pairs by high voltage conduits;
   (e) said electrodes being arranged such that each two adjacent electrodes and two opposite electrodes to said adjacent electrodes are located in the corners of an imaginary square;
   (f) the distance of the electrodes from the walls of said furnace and the mutual distance of the electrodes from each other are determined so that the individual process-technically active bath surfaces extending about the electrodes form a substantially continuous surface covering a maximum horizontal cross section of said vessel;
   (g) said high voltage conduits being positioned symmetrically about said longitudinal axis of said vessel and;
   (h) the current flow in said high voltage conduits to one of said electrodes of each pair of electrodes is opposite in direction to the current flow in said high voltage conduit to the other of said electrodes in each pair to thereby reduce the circuit's inductive reactance.

2. A furnace as claimed in claim 1 wherein,
   (a) more than six electrodes are provided;
   (b) at least one additional transformer is provided in association with high voltage conduits connecting said additional transformers to said electrodes in excess of six; and
   (c) said additional transformers being located at the narrow side of said vessel.

3. A furnace as claimed in claim 1, wherein:

(a) said transformers are each connected on the primary side to form a three phase current system;

(b) the single phase circuits associated in each case with said transformers being connected on the secondary side by the metallic product of said furnace, to thereby form a three phase current system having an equilibrium to the primary system.

4. A furnace as claimed in claim 1, wherein:
(a) a permissible load switch is provided for each transformer to regulate voltage of each single phase system.

5. A furnace as claimed in claim 1, wherein:
(a) said electrodes are individually adjustable in accordance with its process-effective output feed.

* * * * *